United States Patent
Wu

(10) Patent No.: US 8,626,899 B2
(45) Date of Patent: Jan. 7, 2014

(54) METHOD AND SYSTEM FOR MULTICAST STATISTIC COLLECTION

(75) Inventor: Solomon Wu, Milpitas, CA (US)

(73) Assignee: Siemens Enterprise Communications, Inc., Boca Raton, FL (US)

( * ) Notice: Subject to any disclaimer, the term of this patent is extended or adjusted under 35 U.S.C. 154(b) by 341 days.

(21) Appl. No.: 12/682,393

(22) PCT Filed: Oct. 23, 2007

(86) PCT No.: PCT/US2007/022494
§ 371 (c)(1),
(2), (4) Date: May 12, 2010

(87) PCT Pub. No.: WO2009/054824
PCT Pub. Date: Apr. 30, 2009

(65) Prior Publication Data
US 2010/0217861 A1   Aug. 26, 2010

(51) Int. Cl.
*G06F 15/173*   (2006.01)
(52) U.S. Cl.
USPC .......................................... 709/224; 709/223
(58) Field of Classification Search
USPC ........................................................ 709/224
See application file for complete search history.

(56) References Cited

U.S. PATENT DOCUMENTS

| | | | |
|---|---|---|---|
| 2003/0218980 A1* | 11/2003 | Fukushima et al. | 370/230 |
| 2003/0231629 A1* | 12/2003 | Banerjee et al. | 370/390 |
| 2004/0090970 A1 | 5/2004 | Sanchez et al. | |
| 2005/0129017 A1* | 6/2005 | Guingo et al. | 370/390 |
| 2006/0007930 A1 | 1/2006 | Dorenbosch | |
| 2006/0098668 A1* | 5/2006 | Dona | 370/401 |
| 2006/0294259 A1* | 12/2006 | Matefi et al. | 709/248 |
| 2008/0086570 A1* | 4/2008 | Dey et al. | 709/231 |

FOREIGN PATENT DOCUMENTS

| | | |
|---|---|---|
| CN | 1972223 A | 5/2007 |
| EP | 1542394 A1 | 6/2005 |
| WO | 2005041456 A1 | 5/2005 |
| WO | 2007012767 A1 | 2/2007 |

OTHER PUBLICATIONS

International Search Report for PCT/US2007/022494 dated Jul. 14, 2008 (Forms PCT/ISA/220 & PCT/ISA/210).
Written Opinion of the International Searching Authority for PCT/US2007/022494 (Form PCT/ISA/237).

\* cited by examiner

*Primary Examiner* — Hee Soo Kim
(74) *Attorney, Agent, or Firm* — Buchanan Ingersoll & Rooney PC

(57) ABSTRACT

A system (100) and method (200) related to gathering statistical information regarding a data stream. The method (200) may include sending (205), by a data forwarding device (110), an internet protocol (IP) multicast data stream to a multicast group using an internet protocol (IP); and collecting (210) statistical data from a router (120*a-g*) down stream of the forwarding device (110) to determine a number of end point recipients (125, 130, 135) associated with the multicast group and receiving the multicast data stream.

20 Claims, 2 Drawing Sheets

METHOD AND SYSTEM FOR MULTICAST STATISTIC COLLECTION

CROSS-REFERENCE TO RELATED APPLICATIONS

This application is the United States national phase under 35 U.S.C. §371 of PCT International Application No. PCT/US2007/022494, filed on Oct. 23, 2007. That application is incorporated by reference herein.

BACKGROUND

1. Field

Embodiments may generally relate to methods and systems of multicasting. More particularly, some embodiments are concerned with collecting statistical data regarding recipients of multicast data streams.

2. Description

Multicasting of video may provide a mechanism to deliver video to a number of recipients simultaneously, creating copies of the data stream only where necessary. Multicasting may be used to broadcast media presentations in commercial, entertainment, and educational contexts. In some environments, a broadcast may be supported by or based on the number of recipients that receive the broadcast. These environments may include advertisement support commercial broadcasts, as well as educational and enterprise training scenarios where the institution or service organization rendering training services may need an accurate accounting of the entities receiving the video training As such, there exist a need for a system, method, and computer executable program for collecting statistical data regarding recipients of multicast data streams.

SUMMARY

Some embodiments provide a system, method, device, program code and/or means to gather statistical information regarding a multicast data stream. The method may include sending, by a data forwarding device, an internet protocol (IP) multicast data stream to a multicast group using an internet protocol (IP); and collecting statistical data from a router down stream of the forwarding device to determine a number of end point recipients associated with the multicast group and receiving the multicast data stream.

A system according to embodiments herein may include a data forwarding device to send an IP multicast data stream to a multicast group using an internet protocol (IP); a router down stream of the forwarding device to route the multicast data stream the multicast group; and a collection device to collect statistical data from the down stream router to determine a number of end point recipients associated with the multicast group and receiving the multicast data stream.

In some embodiments, a medium having machine executable program instructions stored thereon includes instructions to send, by a data forwarding device, an internet protocol (IP) multicast data stream to a multicast group using an internet protocol (IP); and instructions to collect statistical data from a router down stream of the forwarding device to determine a number of end point recipients associated with the multicast group and receiving the multicast data stream.

With these and other advantages and features that will become hereinafter apparent, further information may be obtained by reference to the following detailed description and appended claims, and to the figures attached hereto.

BRIEF DESCRIPTION OF THE DRAWINGS

Some embodiments are illustrated in the accompanying figures, in which like reference numerals designate like parts, and wherein.

DETAILED DESCRIPTION

Figure 1:
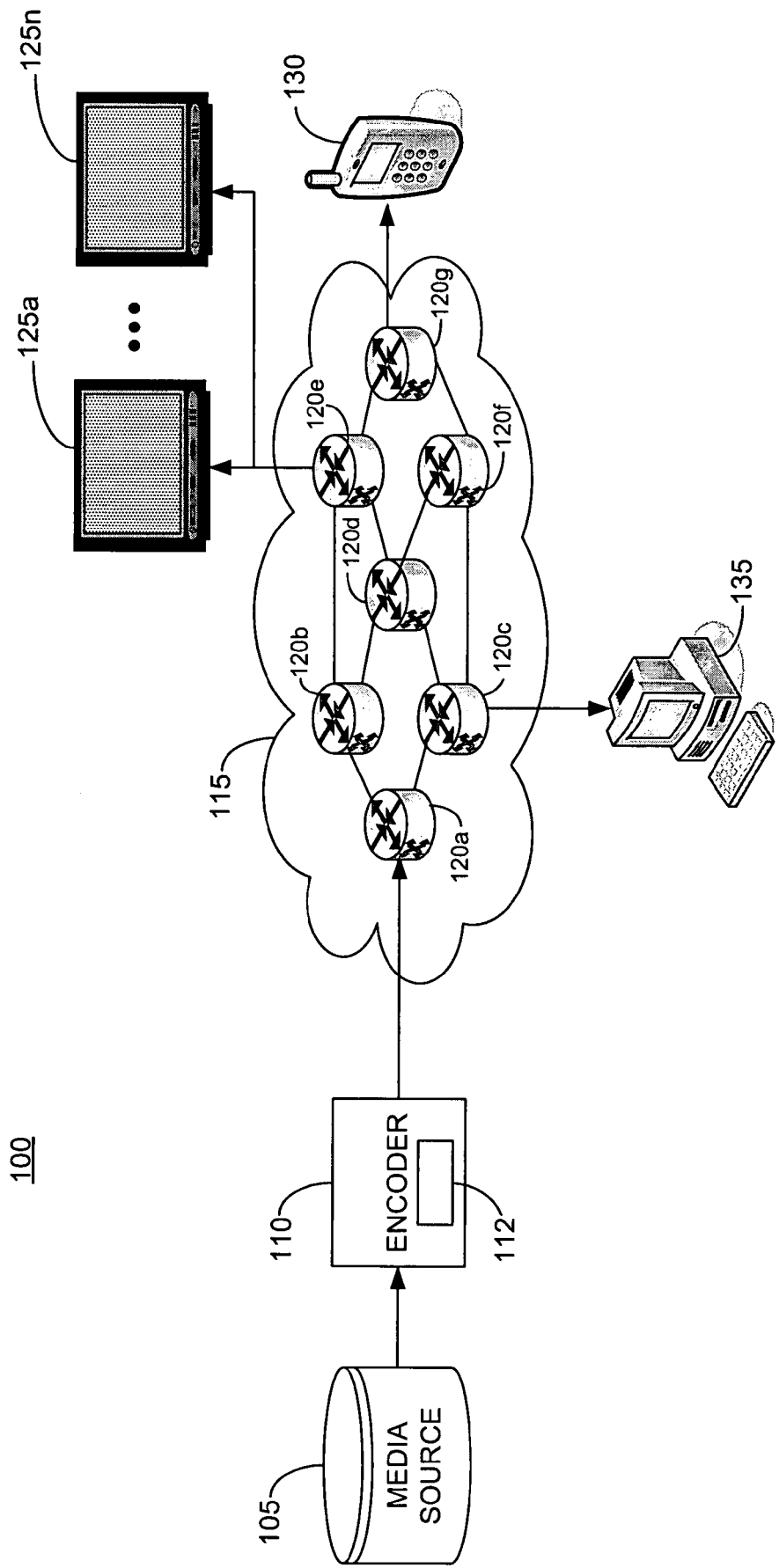
FIG. 1 is a representative block diagram of a system, according to some embodiments herein.

FIG. 1 is an illustrative block diagram of system 100 according to some embodiments herein. System 100 may be provided to deliver, facilitate, improve, or enhance a multicast broadcast according to some embodiments. In some other embodiments, system 100 may include or be interfaced with a media source 105, an encoder 110, a data collection device 112, a transport network 115, and recipients 125a-125n, 130, 135. Media source 105 may include live broadcasts, recorded presentations, store and forward broadcast, and other techniques and methods applicable for providing various forms of multimedia data. The multimedia data may be captured, obtained, or otherwise acquired for multicast broadcast in accordance with other aspects herein using a number of different techniques. For example, media source 105 may be video obtained using analog and video capture equipment, including standard definition and high definition processes, television broadcasts, and satellite communications.

The multimedia data obtained from video source 105 may be encoded to distribute video to end recipients 125a-n, 130, 135. Encoder 110 may be capable of processing and encoding various types and protocols of video signals, including but not limited to MPEG-4 data, a video coding standard by the ISO/IEC Moving Picture Experts Group (MPEG) under the formal standard ISO/IEC 14496.

In some embodiments herein, internet protocol (IP) data packets are multicast to multiple recipient destinations by encoder 110. A single copy of the data stream from media source 105 is forwarded to a group of recipients using a single IP address for the group, in accordance with multicast protocols and techniques. Data addressed to the single multicast group IP address is forwarded to each of a group interested recipients. Routers (e.g. 120a-120g) may be used to route the data the recipients 125a-n, 130, 135. Using standardized multicast IP addressing protocols, a multicast group identifying the set of recipients interested in receiving a particular data stream may be represented by a single address according to a defined standard. Recipients interested in receiving the multicast data stream may join a multicast group using standard IP protocols that manage membership of the multicast group (s). Multicast group membership discovery protocols herein may include, for example, Internet Group Management Protocol (IGMP), Multicast Listener Discovery (MLD), multicast of ATM (Asynchronous Transfer Mode), and others.

In accordance with embodiments herein, a multicast broadcast may use multicast addressing protocols that are now known and those that become known, multicast group membership discovery protocols that are now known and those that become known, and multicast routing protocols that are now known and those that become known. In some embodiments, the multicast routing protocols may include protocol independent Multicast Sparse Mode (PIM-SM), Protocol Independent Multicast Dense Mode (PIM-DM), and Distance Vector Multicast Routing Protocol (DVMRP). In some embodiments, a multicast routing protocol may generate a tree of recipients to indicate the recipients belonging to the multicast group(s).

It should be appreciated that a multicast group herein may include one, more, or none of the recipients 125a-n, 130, 135. It is also noted that more than one recipient may be connected to any one of routers 120a-g. That is, a plurality of recipients may be interfaced with any one of routers 120. For example, televisions 125a-125n may form a multicast group and are connected to router 120e. A single multicast data stream (e.g., a movie broadcast) may be forwarded from encoder 110 via routers 120a and 120b to router 120e. At router 120e, the multicast data stream may be duplicated (as needed) and sent to each of the recipient televisions 125a-n belonging to the multicast group.

It is noted that recipient televisions 125a-125n may include one or more recipient devices. FIG. 1 depicts only two such recipient devices, as a matter of clarity and not as a limitation. Similarly, additional recipient devices 130 may be connected to, for example, router 120g and additional recipient devices 135 may be connected to, for example, router 120c.

It should also be understood that while routers 120a-g are shown as a network of routers, other network and interconnection topographies and arrangements may be provided. For example, the routers 120a-g may include more or fewer routing devices, be arranged in different configurations, and the connections between them (if any) may be provided on an ad hoc, selective, predetermined, variable, or reconfigurable basis. Thus, FIG. 1 is an example of a system embodiment provided to clearly illustrate various aspects of the present disclosure.

In some embodiments, encoder 110, though effective in encoding the multicast data stream, does not provide an efficient manner for accounting for or determining the specific recipients of the multicast broadcast. In some embodiments the IP protocols used, including the use and delivery of the multicast data stream to a single multicast group address precludes determining the number of eventual recipients of the multicast data stream at encoder 110.

In some embodiments herein, data is collected from routers (e.g., 120a-g) downstream of encoder 110 that forwards the data stream to a designated multicast group address over network 115 for delivery to the multicast group(s) recipients by data collection device 112. In accord with embodiments herein, routers located downstream of encoder 110 and prior to recipients 125a-n, 130, 135 may be polled, queried, monitored, or otherwise viewed for the collection of data processed or available at the specific router to determine, for example, the number of recipients receiving a multicast broadcast. Aspects of the multicast addressing, multicast group membership discovery protocols, and multicast routing protocols may be leveraged to determine the number of recipients receiving the multicast data stream packets.

In some embodiments, information regarding a network address receiving the multicast data stream packets may be collected by data collection device 112 and used in the determinations herein. In some embodiments, information regarding a subnet address receiving the multicast data stream packets may be collected and used in the determinations herein.

In some embodiments, a router closest to the recipients of the multicast data stream may provide the data collected in the data collections herein. For example, router 120c may provide data relating to a recipient connected thereto (e.g., host 135), router 120e may provide data relating to recipient 125a-n (e.g., televisions throughout an office park), and router 120g may provide data relating to a smartphone 135.

Figure 2:
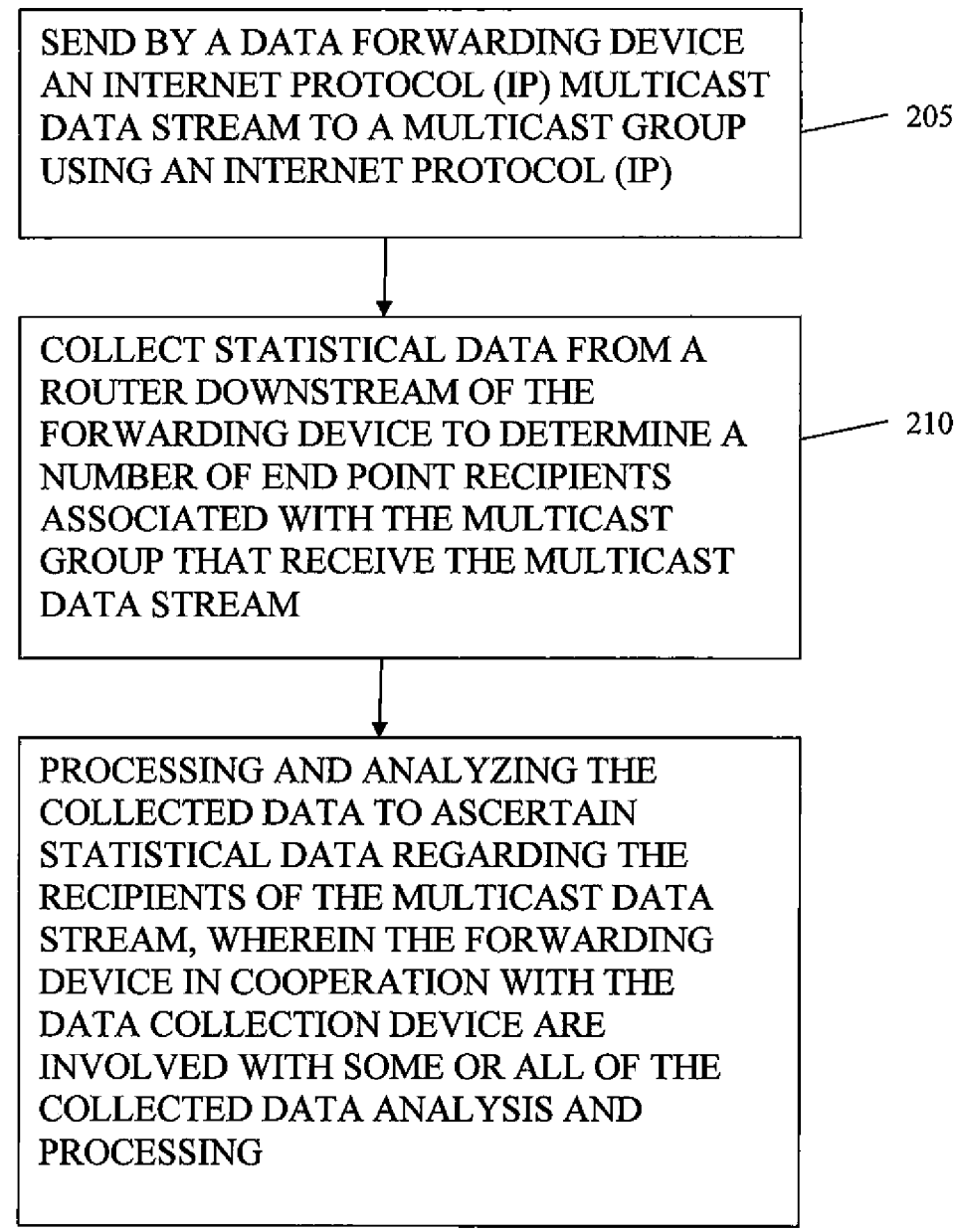
FIG. 2 is a flow diagram of a process, according to some embodiments.

FIG. 2 is a flow diagram of process 200 according to some embodiments. Process 200 may be executed by system 100 using any suitable hardware and/or software arrangement, and may be executed by any suitable device or devices that are now known or become known.

At operation 205, a method for gathering statistical information regarding a data stream is facilitated by sending an IP multicast data stream to a multicast group using an Internet protocol (IP) by a data forwarding device. As discussed above, this aspect of the method may be accomplished by encoder 110. In other embodiments, a device separate and distinct from encoder 110 may be used to provided the requisite functionality in connection with process 200. That is, the forwarding device may be part of or separate from encoder 110. It is also noted that the forwarding device may be implemented in hardware, software, and combinations thereof.

At operation 210, a process of collecting statistical data from a router down stream of the forwarding device to determine a number of end point recipients associated with the multicast group and receiving the multicast data stream is accomplished. This aspect of the method may be accomplished by data collection device 112. Referring to FIG. 1, routers 120a-g actively involved in the delivery of the multicast data stream to the particular recipients (e.g., 125a-n, 130, 135) may have data collected therefrom.

The collected data may be further processed and analyzed to ascertain statistical data regarding the recipients of the multicast data stream. The forwarding device (e.g., encoder 110) may, in cooperation with data collection device 112, be involved with some, none, or all of the collected data analysis and processing. In some embodiments, the data collection device 112 is separate and distinct, functionally and physically, from the forwarding device.

In some embodiments, the methods and systems disclosed herein may be implemented by a combination of hardware and software components. In some aspects, the methods and systems may be accomplished, at least in part, using computing processors to execute computer code and program instructions stored on a memory (e.g., flash memory, RAM, ROM, disk drive, and other media) or otherwise accessible by the processor.

Embodiments described above are not intended to be limited to the specific form set forth herein, but are intended to cover such alternatives, modifications and equivalents as can reasonably be included within the spirit and scope of the appended claims.

The invention claimed is:

1. A method for gathering statistical information regarding a data stream, the method comprising:

sending by an encoder device the data stream received from a media source such that the sent data stream is forwarded over a network of routers for delivery to multicast group recipients, the data stream being an internet protocol multicast data stream sent via an internet protocol by the encoder device to a multicast group comprising the multicast group recipients, the multicast group recipients being end point devices, the encoder device not being one of the routers and not being a router;

collecting statistical data by a data collection device from routers of the network downstream of the encoder device that are actively involved in delivery of the data stream to the multicast group recipients to determine a number of recipients of the multicast group that received the multicast data stream wherein each of the routers are polled, queried, monitored, or otherwise viewed for the collection of data processed or available at that router, the data collection device not being one of the routers; and processing and analyzing the collected data to ascertain statistical data regarding the recipients of the multicast data stream to determine a number of end point recipients associated with the multicast group recipients that received the data stream, wherein the encoder device in cooperation with the data collection device are involved with some or all of the collected data analysis and processing and wherein the data forwarding device and the data collection device are arranged outside of the network of routers.

2. The method of claim 1, wherein an end point device recipient joining the multicast group sends a message to the downstream routers using a multicast group membership discovery protocol.

3. The method claim 1, wherein the data collection device is a component of the encoder device.

4. The method of claim 1, wherein the collecting of statistical data from the routers is based, at least in part, on a multicast distribution tree of recipients.

5. The method of claim 1, wherein the collected statistical data is comprised of at least one of subnet addresses and network addresses of end point devices that received the data stream.

6. The method of claim 1, wherein the encoder device in cooperation with the data collection device are involved with all of the collected data analysis and processing.

7. The method of claim 1, wherein the encoder device in cooperation with the data collection device are involved with only some of the collected data analysis and processing.

8. A system for gathering statistical information regarding a data stream, the system comprising:

a data forwarding device for forwarding the data stream from a media source over a network of routers for delivery to multicast group recipients, the data stream being sent as an internet protocol multicast data stream to a multicast group using an internet protocol, the multicast group comprising the multicast group recipients, the multicast group recipients comprising end point devices, the data forwarding device not being a router;

a plurality of routers of the network downstream of the forwarding device to route the multicast data stream to the multicast group; and a collection device to collect statistical data from the routers actively involved in delivery of the data stream to the multicast group recipients to determine a number of recipients that received the multicast data stream, each of the routers being polled, queried, monitored, or otherwise viewed for the collection of data processed or available at the router, the collection device not being one of the routers; and the forwarding device in cooperation with the collection device being involved with some or all of the collected data analysis and processing of that collected data to ascertain statistical data regarding recipients of the multicast data stream to determine a number of end point recipients associated with the multicast group recipients that received the data stream and wherein the data forwarding device and data collection device are arranged outside of the network of routers.

9. The system of claim 8, wherein the forwarding device is an encoder device and the collection device is a component of the encoder device and wherein the encoder device in cooperation with the collection device being involved with all of the collected data analysis and processing of that collected data to ascertain statistical data regarding recipients of the multicast data stream.

10. The system of claim 8, wherein the forwarding device is an encoder device and the collection device is a component of the encoder device.

11. The system of claim 8, wherein the collecting of statistical data from the first router downstream is based, at least in part, on a multicast distribution tree of recipients.

12. The system of claim 8, wherein the collected statistical data is comprised of at least one of subnet addresses and network addresses of end point devices that received the data stream.

13. The system of claim 8, wherein the collection device is a component of the forwarding device.

14. The system of claim 13, wherein the forwarding device in cooperation with the collection device are involved with all of the collected data analysis and processing of that collected data to ascertain statistical data regarding recipients of the multicast data stream.

15. The system of claim 9, wherein the multicast data stream is one of: (a) video obtained using analog or video capture equipment, (b) satellite communications, and (c) television broadcasts.

16. The method of claim 1, wherein the multicast data stream is one of: (a) video obtained using analog or video capture equipment, (b) satellite communications, and (c) at least one television broadcast.

17. The method of claim 1, wherein the data collection device is upstream of the at least one router of the network from which the data collection device collects statistical data.

18. The system of claim 8 wherein the collection device is upstream of the first router of the network.

19. A method for gathering statistical information regarding a data stream, the method comprising:

sending by an encoder device the data stream received from a media source such that the sent data stream is forwarded over a network of routers for delivery to multicast group recipients, the data stream being an internet protocol multicast data stream sent via an internet protocol by the encoder device to a multicast group comprising the multicast group recipients, the multicast group recipients being end point devices;

collecting statistical data by a data collection device from the routers of the network downstream of the encoder device that are actively involved in delivery of the data stream to the multicast group recipients to determine a number of recipients of the multicast group that received the multicast data stream, wherein each of the routers is polled, queried, monitored, or otherwise viewed for the collection of data processed or available at the router and wherein the data collection device and the encoder are outside of the network of routers; and processing and analyzing the collected data to ascertain statistical data regarding the recipients of the multicast data stream to determine a number of end point recipients associated with the multicast group recipients that receive the data stream, wherein the encoder device in cooperation with the data collection device are involved with all of the collected data analysis and processing.

20. The method of claim 19 wherein the data collection device is a component of the encoder device.

* * * * *